United States Patent [19]

Mills

[11] 4,432,393

[45] Feb. 21, 1984

[54] ACCUMULATOR

[75] Inventor: Carl R. Mills, East Dundee, Ill.

[73] Assignee: Chicago Fluid Power Corp., Streamwood, Ill.

[21] Appl. No.: 451,077

[22] Filed: Dec. 20, 1982

[51] Int. Cl.³ .............................................. F16L 55/04

[52] U.S. Cl. .......................................... 138/30; 29/446

[58] Field of Search ........................ 138/30; 220/85 B; 29/436, 446

[56] References Cited

U.S. PATENT DOCUMENTS

| | | | |
|---|---|---|---|
| 1,824,342 | 9/1931 | Gillen et al. | 138/30 |
| 2,390,319 | 12/1945 | Overbeke | 138/30 |
| 2,878,835 | 3/1959 | Peterson | 138/30 |
| 2,932,321 | 4/1960 | Mercier | 138/30 |
| 3,143,144 | 8/1964 | Peet | 138/30 |
| 3,808,676 | 5/1974 | Schrock et al. | 29/446 |
| 3,825,034 | 7/1974 | Chouings | 138/30 |
| 3,893,485 | 7/1975 | Loukonen | 138/30 |

*Primary Examiner*—John W. Shepperd
*Attorney, Agent, or Firm*—Augustus G. Douvas

[57] ABSTRACT

A sleeve-type bladder accumulator having an outer generally cylindrical body, an apertured cylindrical stop tube concentrically disposed within the cylindrical body, an elastic tubular bladder sleeve partially enveloping the stop tube with each end of the sleeve being anchored by sandwiching between a bladder retainer carried on the adjacent end of the stop tube and the end cap fixed to the adjacent end of the cylindrical body, a clamping spring nested within the bore of one end of the stop tube and a spring socket formed by the adjacent bladder retainer to exert a force upon the stop tube tending to move the stop tube away from the adjacent bladder retainer to secure a pair of split shear rings which lock each end of the cylindrical body to its adjacent end cap, and sealing means made more secure by the force generated by the clamping spring.

12 Claims, 4 Drawing Figures

ACCUMULATOR

BACKGROUND OF THE INVENTION

This invention relates generally to hydraulic accumulators, and more particularly to accumulators of the bladder sleeve type in which an elastic sleeve divides the accumulator chamber into fluid and gas cavities.

The prior art is prolific in accumulator designs which employ expandable sleeve bladders within accumulators to define two chambers of varying volume. One chamber contains a precharge gas, and the other chamber a hydraulic oil which is to be confined within the accumulator at a high pressure. In many of these sleeve bladder designs, a perforated cylindrical stop tube is positioned within an outer cylindrical tube-like housing. The sleeve bladder is disposed between the inner tube and the cylindrical housing, and it is the only element that separates the hydraulic oil from the gas. In certain designs, the hydraulic oil is on the outside of the sleeve bladder and the gas is on the inside, for example, see U.S. Pat. No. 2,278,688.

The accumulator designs of the prior art employing bladder sleeves use fasteners or threaded components in order to maintain the accumulator assembly. The use of these fasteners or threaded components results in a relatively time consuming assembly operation. In the event of accumulator malfunction, the disassembly for purposes of internal inspection and repair also requires a time consuming operation.

SUMMARY OF THE INVENTION

A principal object of this invention is to simplify the design, manufacture and assembly of hydraulic accumulators through the use of component parts which do not require fasteners or threaded connections to effect assembly.

Another principal object of the invention is to improve the sealing of the hydraulic fluid and gas employed in an accumulator through the use of a design that does not require fasteners or threaded elements and which is pressure sealed.

A preferred embodiment of the accumulator of this invention comprises a sleeve type bladder accumulator having an outer generally cylindrical body. An apertured stop tube is concentrically disposed within the cylinder body. An elastic bladder sleeve encompasses a stop tube so as to divide the accumulator cavity into gas and fluid chambers. Each end of the bladder sleeve is anchored between a bladder retainer carried on the adjacent end of the stop tube and an end cap fixed to the adjacent end of the cylindrical body. A clamping spring is nested within the bore of one end of the stop tube and a spring socket formed by the adjacent bladder retainer. This spring exerts a force upon the stop tube which tends to move the stop tube away from the adjacent bladder retainer and toward an opposite end cap. A pair of split shear rings locks each end of the cylindrical body to its adjacent end cap in response to the clamping force generated by the spring. Sealing means which include ring seals are also made more secure by the forces generated by the clamping spring.

The foregoing structure, by virtue of its spring loaded assembly, does not require fasteners or threaded components, such as, end plates or covers in order to effect assembly.

Additionally, the accumulator is pressure sealed, that is, the greater pressures to which the internal accumulator cavities are subjected, the more effective is the seal and also more secure are the end caps. In particular, both the seals and the end caps are secured in direct proportion to the pressure applied internally.

As an additional advantage, notwithstanding the absence of threaded fasteners and other elements, it is essentially impossible to take the accumulator apart while it is subjected to internal pressures which would be sufficient to cause harm to operating or service personnel.

DETAILED DESCRIPTION OF THE DRAWINGS

In order that all of the structural features for attaining the objects of this invention may be readily understood reference is made to the accompanying drawings wherein.

DETAILED DESCRIPTION OF THE INVENTION

Figure 1:
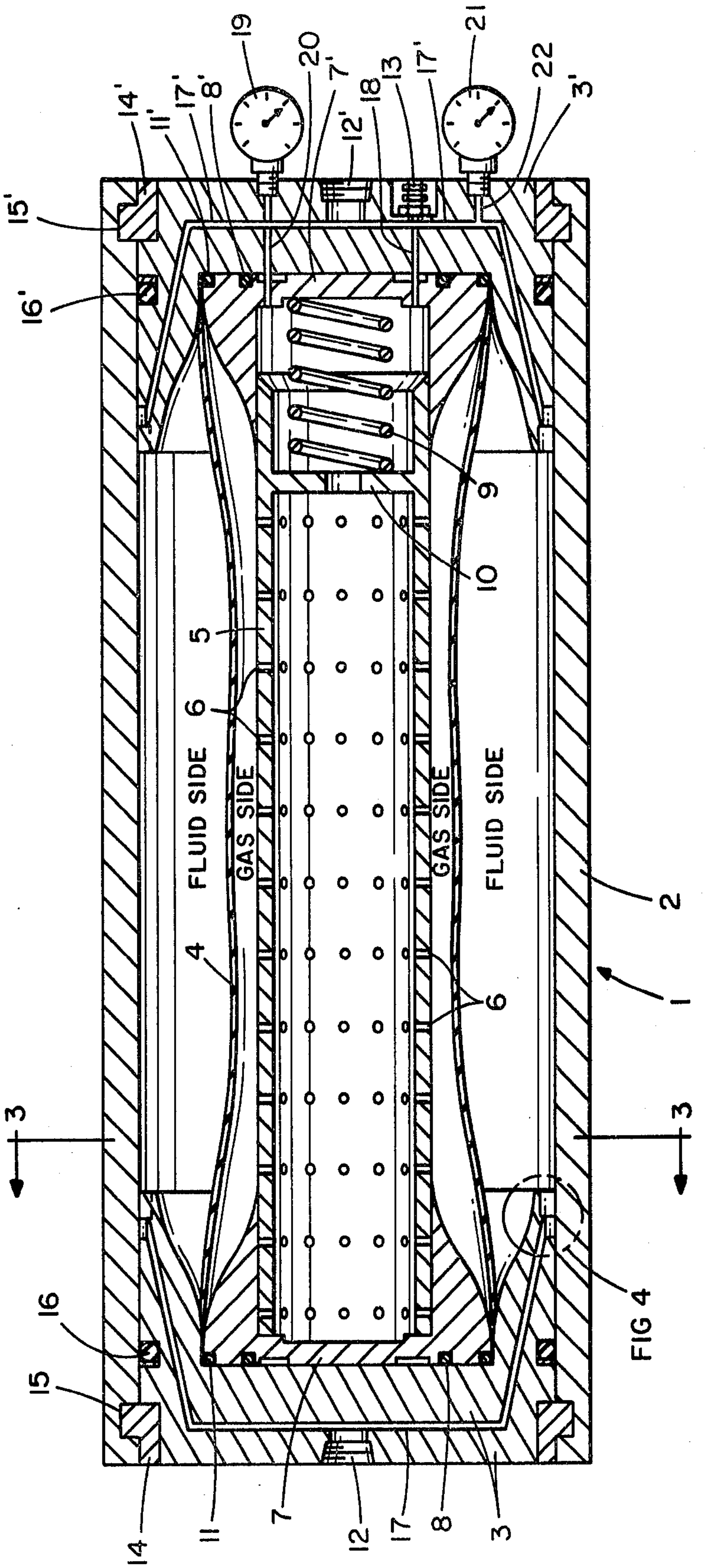
FIG. 1 is a longitudinal sectional view of a preferred embodiment of the accumulator of this invention taken along line 1—1 of FIG. 3.

Referring to FIG. 1, bladder accumulator 1 comprises a metallic outer cylindrical tube 2 whose left and right bore openings are closed by a pair of end caps 3, 3' to define an enclosed chamber divided by bladder sleeve 4 into an annular fluid cavity and an annular gas cavity. A stop tube 5, which is formed with a plurality of spaced holes 6 passing through the cylindrical wall of the tube, is disposed within the enclosed cavity defined by outer cylindrical tube 2. The left and right extremities of stop tube 5 carry a pair of bladder retainers 7, 7'. These bladder retainers are disposed relative the end caps 3, 3' so that the stop tube is axially aligned and concentric with the outer cylindrical tube 2. Each bladder retainer 7, 7' is formed with a circular wall directed toward the center of the cylindrical body to define a socketlike cavity which receives one end of the stop tube.

Stop tube 5 is also enveloped by the elastic cylindrical bladder sleeve 4. Each end of the bladder sleeve is clamped between a bladder retainer 7, 7' and an end cap 3, 3'. A helical clamping spring 9 is partially disposed within the bore of the right end of stop tube 5 so as to be situated between end cap 3' and apertured spring abutment 10. Clamping spring 9 exerts a clamping force between end caps 3, 3' and bladder retainers 7, 7' sufficient to compress a set of bladder-sleeve end seals 11, 11' until fluid and gas pressures are built up through fluid side end cap openings 12, 12', and gas charging valve 13 within accumulator 1 to pressure energize and render tighter the bladder sleeve end seals 11, 11'. Separator seals 8, 8' are used to minimize the pressure area counterbalancing bladder retainers 7, 7'.

Figure 2:
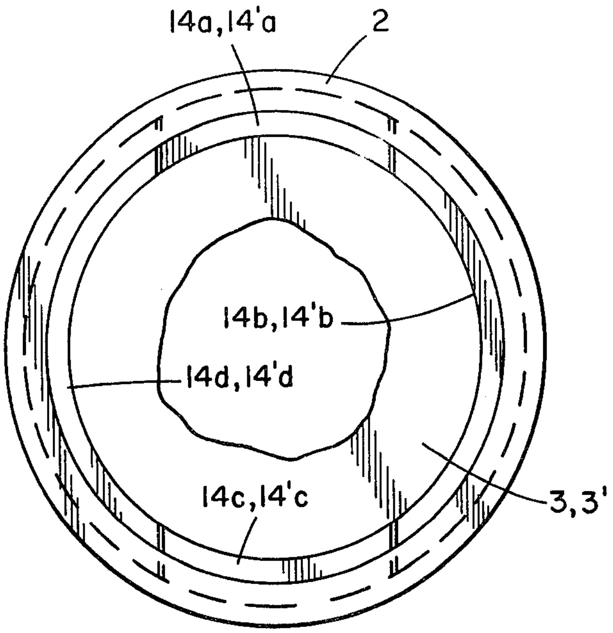
FIG. 2 is a simplified end view showing the disposition of the several pieces of a split shear ring on an end cap.

The automatic clamping force generated by clamping spring 9 promotes the effective use of a simplified split shear ring 14, 14' mechanism for retaining end caps 3, 3' on outer cylindrical tube 2, thus eliminating the need for threaded caps or mechanical fasteners. In particular, as is shown in FIG. 2, each split shear ring 14, 14' comprises four separate pieces **14*a*, 14*b*, 14*c*, 14*d*, and 14'*a*, 14'*b*, 14'*c*, 14'*d*, as the case may be. As is shown in FIG. 1, the several pieces of the split shear rings 14, 14' are preferably formed with a right-angle cross section so that the vertical projecting leg of each shear ring may be received into mating grooves 15, 15' formed at the bore ends of cylinder tube 2**.

End caps 3, 3' are effectively sealed with respect to the wall of cylindrical tube 2 by a pair of end seals 16, 16'. End cap 3 is formed with a fluid passage 17 which connects end cap opening 12 to the fluid side of the accumulator, and end cap 3' is formed with a passage 17' which connects end cap opening 12' with the fluid side of the accumulator. End cap 3' is also formed with gas passage 18 which connects the gas inlet at gas charging valve 13 to the gas side of the accumulator.

The gas pressure within the gas side of accumulator 1 is monitored by gas pressure gauge 19. Gauge 19 is connected to the internal cavity which defines the gas side of the accumulator by a passage 20 (FIG. 1) which extends through both end cap 3' and bladder retainer 7'.

The fluid pressure within the fluid side of the accumulator is monitored by a fluid pressure gauge 21 which communicates with the fluid passage 17' through a short passage 22.

With this direct connection of gauges 19 and 21 to both the gas and fluid sides of the accumulator, the pressures actually appearing within the accumulator cavities are monitored directly. Accordingly, any leakage of either gas or fluid which would affect operation can be observed by visually monitoring the gauges. Similarly, any collapse of bladder 4 upon the outer wall of stop tube 5 could also be monitored by observing an objectionably low gas pressure at gauge 19.

Figure 4:
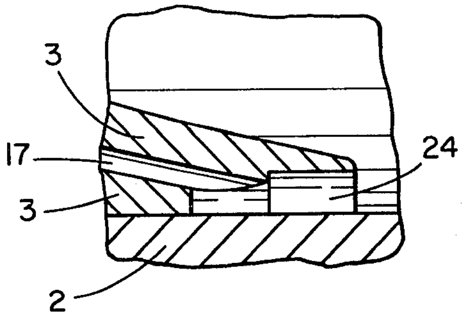
FIG. 4 is an enlarged detail view, taken from FIG. 1, of a typical support web which defines an end cap opening.
Figure 3:
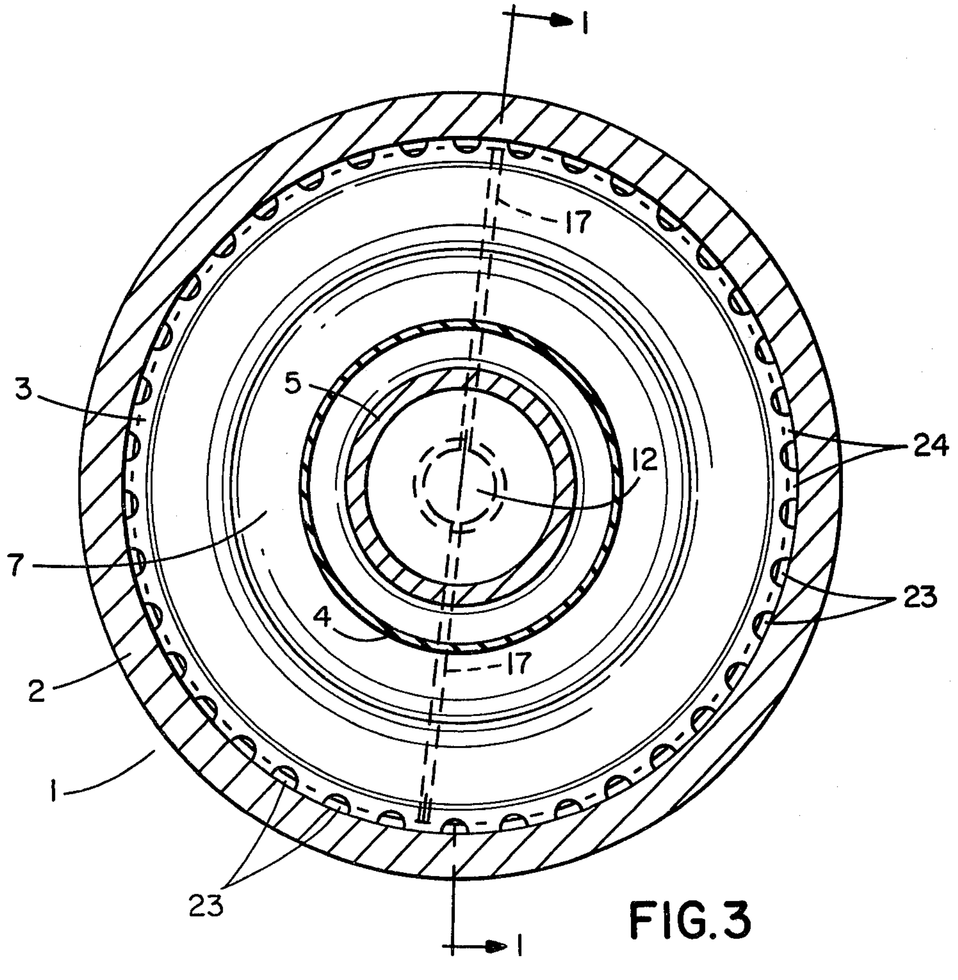
FIG. 3 is a section view taken along line 3—3 of FIG. 1 showing a detailed view of the end cap openings into the fluid side of the accumulator.

As is shown in FIGS. 1, 3 and also the enlarged detail of FIG. 4, fluid passage 17 located within end cap 3 leads into a plurality of substantially semicircular fluid openings 23 which are defined by supporting webs 24. The supporting webs 24 (as shown in FIG. 4) are an integral part of end cap 3. Accordingly, any fluid supplied at inlet opening 12 passes through fluid passage 17 and fluid openings 23 into the fluid side of the accumulator. End cap 3' is formed with an annular ring of inlet openings identical in construction to those of end cap 3.

A principal novel feature of this invention resides in the spring-loaded assembly characterized in the disposition of clamping spring 9 between bladder retainer 7' and spring abutment 10. In view of the fact that the right end (see FIG. 1) of stop tube 5 is slidably received within bladder retainer 7', spring 9 exerts a force tending to slidably extend stop tube 5 to the left relative bladder retainer 7'. The force so generated by spring 9 clamps the ends of bladder sleeve 4 and also effectively compresses end seals 11, 11'. Accordingly, the force generated by the spring-loaded assembly eliminates the need for fasteners and threaded end plates which must be manually applied and removed in a time consuming operation.

From another aspect, the accumulator is pressure sealed without the necessity of fasteners or threaded end plates. The greater the pressure to which the internal cavities of the accumulator are subjected, end seals 11, 11' become more effective and also end caps 3, 3' become more secure. In particular, both the seals and the end caps are secured in proportion to the internally applied pressure, either gas or fluid. Additionally, it is impossible to take the accumulator apart while it is operating under pressures which are sufficiently great to cause physical harm to an operator attempting objectionable disassembly.

The assembly of accumulator 1 is as follows:

(1) install end seal 16 on end cap 3, and then slide this subcombination into cylindrical tube 2 sufficiently far so that split shear ring 14 may be placed into groove 15;

(2) slide end cap 3 to the left (FIG. 1) until the end cap mates with split shear ring 14, capturing the split shear ring into place;

(3) stretch the left end of bladder sleeve 4 over the end of bladder retainer 7 until bladder-sleeve end seal 11 drops into place as shown;

(4) insert stop tube 5 through bladder sleeve 4 and into bladder retainer 7;

(5) set cylindrical tube 2 on end with the open end of the tube facing upwardly;

(6) insert spring 6 and separator seal 8 into place as shown, and then slide bladder sleeve 4 and stop tube 5 into the bore of cylindrical tube 2 so as to nest on end cap 3;

(7) slide bladder retainer 7' over the right end of stop tube 5 and stretch bladder-sleeve end seal 11' over bladder retainer 7' and insert separatore seal 8' into place;

(8) stretch tube end seal 16' over end cap 3' and slide these elements into the open end of cylindrical tube 2 so as to engage bladder retainer 7';

(9) press end cap 3' within the bore of cylindrical tube 2 to compress spring 9 until end cap 3' is inside cylindrical tube 2 far enough to install split shear ring 14' into place;

(10) allow spring 9 to return end cap 3' to the retract direction so as to capture split shear ring 14' into place;

(11) install gauges 19 and 21 and gas charging valve 13; and

(12) plug either fluid inlet opening 12 or 12' or use both if application requires.

The disassembly of accumulator 1 is effective by essentially reversing the assembly operation. In either case, it should be noted, that use of fasteners in retaining the accumulator cylinder together is completely eliminated.

The above described preferred embodiment illustrates the principles of this invention. Structural modifications can be made without departing from the scope of the invention.

What is claimed is:

1. In a sleeve-type bladder accumulator having an outer generally cylindrical body, an apertured generally cylindrical stop tube concentrically disposed within the cylindrical body, and an elastic tubular bladder sleeve partially enveloping the stop tube with each end of the sleeve being anchored by a bladder retainer carried on the adjacent end of the stop tube and an end cap fixed to the adjacent end of the cylindrical body, the improvement comprising clamping means disposed between one end of the stop tube and the adjacent end cap exerting a force upon the stop tube tending to move the stop tube away from that end cap and toward the opposite end cap, and sealing means made more secure by the force generated by the clamping means.

2. The combination of claim 1 in which the clamping means is a spring nested within a cavity defined by one end of the stop tube and the bladder retainer carried by that end of the stop tube with the spring moving the stop tube and the adjacent bladder retainer away from one another so that an increased clamping force is applied to the anchored ends of the bladder retainer and an increased sealing force is applied to the sealing means.

3. The combination of claim 2 in which a split shear ring locks each end of the cylindrical body to its adjacent end cap.

4. The combination of claim 3 in which each split shear ring is lodged in mating grooves formed at the ends of the cylindrical body.

5. The combination of claim 4 in which placement of the split shear ring adjacent the clamping means is effected by compressing the spring to enable the sections forming a single split shear ring to be placed in its mating groove and locked into place by expansion of the spring.

6. The combination of claim 1 in which each end cap has a flared circular wall directed towards the interior of the cylindrical body, with the circular wall having a circular lip formed with a plurality of openings each separated by a support web, and each end cap being formed with fluid passage means to interconnect the fluid openings of that end cap to provide fluid access to the fluid cavity of the accumulator.

7. The combination of claim 1 in which each end cap has a flared circular wall directed towards the center of the cylindrical body to define a socketlike cavity which houses a bladder retainer.

8. The combination of claim 7 in which each bladder retainer is formed with a circular wall directed towards the center of the cylindrical body to define a socketlike cavity which receives one end of the stop tube.

9. The combination of claim 8 in which the clamping means is a spring housed within the socketlike cavity of one of the bladder retainers and the bore of the adjacent end of the stop tube.

10. The combination of claim 9 in which the stop tube includes an apertured abutment formed within the bore of the stop tube against which the spring is seated.

11. In a sleeve-type bladder accumulator having an outer generally cylindrical body, an apertured generally cylindrical stop tube concentrically disposed within the cylindrical body, and an elastic tubular bladder sleeve partially enveloping the stop tube with each end of the sleeve being anchored by sandwiching between a bladder retainer carried on the adjacent end of the stop tube and an end cap fixed to the adjacent end of the cylindrical body, the improvement comprising clamping means nested within the bore of one end of the stop tube and a spring socket formed by the adjacent bladder retainer to exert a force upon the stop tube tending to move the stop tube away from the adjacent bladder retainer and toward the opposite end cap, and sealing means made more secure by the force generated by the clamping means.

12. The combination of claim 11 in which the sealing means is a ring seal sandwiched between each bladder retainer and its associated end cap.

* * * * *